United States Patent [19]

Ruppert

[11] Patent Number: 5,050,532

[45] Date of Patent: Sep. 24, 1991

[54] METHOD OF MOISTENING SUCH ARTICLES AS TOOLS OR WORKPIECES WITH A LIQUID, SUCH AS A LUBRICANT, COOLANT, OR ADHESIVE, AND DEVICE FOR CARRYING OUT THE METHOD

[75] Inventor: Klaus Ruppert, Siegen, Fed. Rep. of Germany

[73] Assignee: Hundt & Weber Schaltgerate GmbH, Freudenberg, Fed. Rep. of Germany

[21] Appl. No.: 412,028

[22] Filed: Sep. 25, 1989

[30] Foreign Application Priority Data

Oct. 3, 1988 [DE] Fed. Rep. of Germany ....... 3833581

[51] Int. Cl.$^5$ .................... B05B 7/04; B05B 12/12
[52] U.S. Cl. .................... 118/663; 118/666; 118/300; 118/316; 239/311; 239/399; 239/402; 239/427.3; 239/434.5
[58] Field of Search ............... 118/300, 313, 316, 663, 118/666; 239/311, 369, 302, 399, 427.3, 402, 403, 434.5, DIG. 8

[56] References Cited

U.S. PATENT DOCUMENTS

| | | | |
|---|---|---|---|
| 3,621,918 | 11/1971 | Damron et al. | 239/369 |
| 3,774,846 | 11/1973 | Schurig et al. | 239/427.3 |
| 3,853,784 | 12/1974 | Rogers | 239/311 |
| 4,309,456 | 1/1982 | Lock | 118/300 |
| 4,409,014 | 10/1983 | Taylor et al. | 239/311 |
| 4,629,164 | 12/1986 | Summerville | 239/302 |

OTHER PUBLICATIONS

Accu—Lube Nr. 13b-0387; Rexim Werkzeugvertriebs-GmbH (no pub. date).

Primary Examiner—Michael Wityshyn
Attorney, Agent, or Firm—Sprung Horn Kramer & Woods

[57] ABSTRACT

In a method of moistening such articles as tools (drills, band saws, circular saws, thread cuttters and similar tools as well as stamping, drawing, and sectioning tools) or workpieces (metal or plastic articles being machined, pipes that are being sawn through, or sheet metal being rolled into structural piping for example) with a liquid (such as a lubricant or coolant for tools and workpieces or an adhesive for workpieces), wherein the liquid is removed from a reserve of liquid and supplied by way of a pipeline to a dispenser that is aimed at the area of the article to be moistened, the pipeline having flow controls and a blender for blending a gaseous medium into the liquid, the improvement wherein the liquid is mixed with the gaseous medium in a gyration chamber into a fluid that is supplied through tubing to a dispenser and sprayed onto the area to be moistened through the dispenser.

20 Claims, 2 Drawing Sheets

METHOD OF MOISTENING SUCH ARTICLES AS TOOLS OR WORKPIECES WITH A LIQUID, SUCH AS A LUBRICANT, COOLANT, OR ADHESIVE, AND DEVICE FOR CARRYING OUT THE METHOD

BACKGROUND OF THE INVENTION

The invention concerns a method and apparatus for moistening such articles as tools (drills, band saws, circular saws, thread cutters and similar tools as well as stamping, drawing, and sectioning tools) or workpieces (metal or plastic articles being machined, pipes that are being sawn through, or sheet metal being rolled into structural piping for example) with a liquid (such as a lubricant or coolant for tools and workpieces or an adhesive for workpieces), whereby the liquid is removed from a reserve of liquid and supplied by way of a pipeline subject to controlled conditions to a dispenser, a nozzle for example, that is aimed at the area of the article to be moistened, whereby the pipeline has flow controls and a blender for blending a gaseous medium into the liquid.

A method and apparatus of this type is known from the sales literature ACCU-Lube No. 13 b-0387 published by Rexim Werkzeugvertriebs-GmbH, 7133 Maulbron 2, Federal Republic of Germany.

A mixture of oil and water ("drilling water") is usually employed to lubricate and cool tools that machine workpieces. Large volumes (e.g. several hundred liters an hour) of the mixture are supplied to the area being machined and must be retrieved below the machine, a procedure that is inconvenient and detrimental to the environment and involves considerable expense for processing the used mixture.

Such shaping procedures as stamping, drawing, and rolling also require moistening of the tools (e.g. rollers, dies, or drawing tools) and workpieces (e.g. piping) with a lubricant.

The method known from the aforesaid literature employs a lubricant that, although it is liquid, is supplied only in very small quantities to the tool's cutting surface by way of flow controls. This approach eliminates the need to recover large volumes of lubricant, which is never 100% effective, and accordingly reduces damage to the environment and maintains a substantially cleaner shop.

The same literature describes a device for carrying out the method, wherein liquid, which consists of a fatty alcohol, is supplied from a reservoir through flow controls and subject to electromagnetic valves to tubing. The tubing's nozzle can be secured with a magnet to the housing of the tool in the vicinity of the processing area. As the procedure is initiated, the lubricant is supplied to the area being lubricated, that is, either by a manually activated two-way switch, by a pedal, or by way of an electromagnetic valve.

As is evident from an illustration in the publication, the flow controls operate by compressed air and forward a prescribed volume of lubricant to the site being lubricated when activated by the switch, pedal, or valve.

Tests of a device constructed in accordance with this illustration have demonstrated certain drawbacks. It is impossible to optimally control the flow of liquid during heavy-duty operations. When a bundle of pipes is sawn with a circular or band saw for instance, the known device demands relatively a lot of lubricant to prevent the blade from getting jammed in the pipes and breaking. This means of course that the used lubricant must be recovered and removed.

The probable causes of this unsatisfactory behavior on the part of the known device are that the precision of its flow controls leaves a lot to be desired and that the lubricant cannot be distributed uniformly enough over the operating field of the tool or workpiece, so that excess lubricant must be applied to ensure that enough reaches the least accessible areas.

To prevent malfunctions in fact, the operator must always provisionally adjust the supply of lubricant high enough to ensure a constant excess, not only contaminating the shop but leaving large volumes of lubricant on the workpiece that must be removed later, to say nothing of the unnecessarily high consumption of lubricant entailed by this method.

SUMMARY OF THE INVENTION

The object of the invention is to improve the known method and apparatus to the extent that the volume of lubricant supplied to the operating field can be controlled more precisely and that the lubricant can be distributed more uniformly over the field. The same object applies when the liquid is a coolant or adhesive.

This object is attained in the method in accordance with the invention by the improvement wherein the liquid, which preferably contains fatty alcohol in the event that metal is being machined, is mixed with a gaseous medium in a gyration chamber into a fluid that is supplied through tubing to a dispenser (nozzle) and sprayed onto the area to be moistened through the dispenser.

Mixing the liquid and gaseous medium in a gyration chamber produces a fluid consisting of very fine droplets that can be dispensed much more uniformly through the nozzle with its flow (pure unit of time or operating rate) controlled much more precisely than is possible at the state of the art.

It has been demonstrated that the liquid can be supplied to the gyration chamber and hence to the operating field in pulses, simplifying the controls, with each pulse supplying a particular volume (e.g. 1 "drop"), whereby the pipeline can be set to dictate a desired number of pulses per unit of time (e.g. 5–30 pulses/sec) depending on the cutting rate and/or the structure of the tool or workpiece.

The setting in another embodiment of the method ensures that most of the lubricant evaporates subject to the heat generated by the machining process, with most of the rest continuing to adhere to and removed along with the waste removed from the workpiece and with very little remaining on the tool or workpiece itself.

The rate of flow can be controlled even more precisely when in accordance with another embodiment of the invention the fluid that is created in the gyration chamber is thoroughly mixed with a forwarding gas. The forwarding gas can be the same gas that the liquid is blended with to create the fluid and can in practical terms be compressed air, although it can also be another and preferably inert gas, nitrogen for example. This "two-stage" blending (of gas to create an "initial fluid" and then of forwarding gas to create a "final fluid") results in a fluid with especially fine droplets and in a mixture or ratio of liquid to gas that is especially precisely controllable and uniform.

The invention also concerns a device for carrying out the method and consisting of a source (reservoir or pipeline) of liquid (lubricant, coolant, or adhesive), of a pump for forwarding the liquid and communicating with the source (reservoir, pipeline, closed-circulation line, etc.) by way of tubing or a line, of one or more sections of tubing or lines leading from the pump to nozzles in the vicinity of the area to be moistened, and of controls for the pump. This device, which is known from the aforesaid sales literature, is characterized in accordance with the invention by the improvement that comprises a gyration chamber between the pump and the tubing or line leading to the nozzles that communicates with a source of gas, air for instance, and that gyrates the incoming liquid together with a prescribable volume of gas to create a mixture (fluid) of gas and liquid.

One embodiment of this device has a blender between the gyration chamber and the tubing or line leading to the nozzles that communicates with a source of forwarding gas, air for instance, and blends a prescribable volume of forwarding gas into the fluid.

Another embodiment of this device has at least two mutually independently controlled pumps, each with a downstream gyration chamber (and optionally a blender), tubing (line), and nozzles. This system makes it possible to moisten both sides of a tool that has an extensive surface, a band saw or circular saw for example, at the same time with the same amount or different but controlled amounts of a liquid, a lubricant for example.

It is practical for the pump to be a pneumatic piston-driven pump with a mechanically adjustable throughput per stroke, per operating rate, or per unit of time. A very wide range of piston-driven pumps of this type has long been known in the form of flow-control pumps.

The system can be controlled even more precisely if, in accordance with still another embodiment of the invention, a valve, which can for instance be activated electrically and which is activated by controls to obtain the prescribed volume of liquid, is associated with each pump and if both the gaseous medium that drives the pump and the fluid gas, which can be the forwarding gas, are supplied by way of additional electrically controlled valves that are connected to controls.

It is practical for controls of this type to be connected to sensors that determine at least one of the following operating states:

1. readiness of the machine tool to operate,
2. commencement of machining,
3. presence of energy (electricity or compressed air) for operating the pump,
4. presence of liquid, such as lubricant (or adhesive) in the reservoir (or supply line),
5. state of a switch that switches between automatic and external (e.g. manual) controls,
6. liquid in the reservoir below a prescribed level (specific minimum),
7. temperature of tool and/or workpiece above a specific level, and
8. residual moisture content of waste below an initial lower level or above another and higher level.

The controls should also have control-voltage output terminals, transistor or thyristors for example, that would make it possible to activate electrically activated valves (magnetic valves or electric contactors)

The controls could then be employed to activate a) the pneumatic valves or electric contactors (control components) that supply or discontinue the energy that drives the pumps,
b) the component that controls the line that supplies gyrating or forwarding gas,
c) the component that controls the line leading out of the first or second (or additional) pump,
d) the control component that releases the tool,
e) the control component that activates a visible and-/or audible alarm,
f) the activation of optical displays, light-emitting diodes or liquid crystals for example, that represent various operating states, or
g) external monitoring equipment.

It is helpful for the controls to comprise a microprocessor that senses (especially serially) the operating states and generates control outputs at prescribed intervals.

It has been demonstrated practical to accommodate the controls, displays, pump, gyration chamber, and optionally the blender in a common housing that features connections for compressed air and/or electricity and a supply line for the liquid (lubricant or adhesive) and tubing leading to the nozzles. The housing can have a reservoir for the liquid instead of a supply line, preferably a reservoir with a visible level. The reservoir can accordingly be made of glass, rest on top of the housing, and be replaced when empty.

The whole system can be very compact and can be positioned at eye level and within view of the operator, who can accordingly monitor both the field of operation and the operation of the device in accordance with the invention very comfortably without shifting his glance or shifting it only slightly.

The system in accordance with the invention also makes it possible to turn off the tool if the microprocessor determines that the conditions are no longer conducive to satisfactory lubrication or cooling.

This is impossible in the state of the art, at which lubrication or cooling may become unsatisfactory when the supply of lubricant is interrupted and the operator either does not notice it or is absent, leading to damage to the tool or workpiece.

Embodiments of the invention will now be described in greater detail with reference to the drawings, wherein

DESCRIPTION OF THE PREFERRED EMBODIMENT

Figure 1:
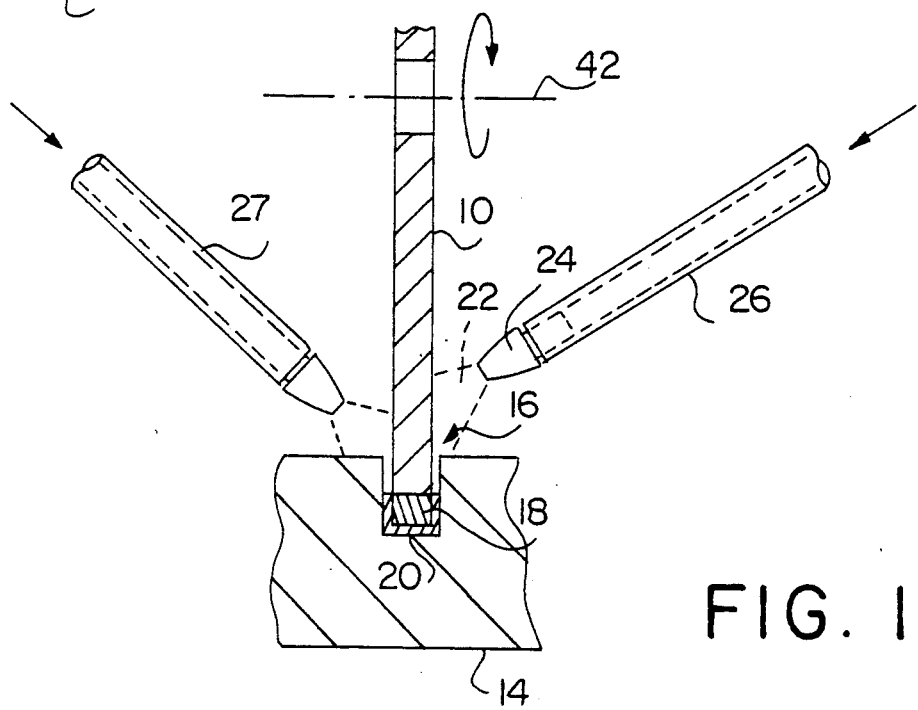
FIG. 1 is a partly sectional view of a circular-saw blade by way of example in conjunction with a workpiece, with nozzles to supply lubricant to each side of the saw in accordance with the invention.

FIG. 1 is a partly sectional view of a tool 10 (a circular saw blade rotating around a shaft 12) cutting through a metal workpiece 14, high-quality steel pipe for instance. To cool and lubricate field 16 of operation, specifically the area 20 where edge 18 (manufactured from hard metal for example) is removing waste from workpiece 14, tool 10 and workpiece 14 are moistened with a mixture (fluid) 22 of liquid and gas. The fluid emerges from a nozzle 24 that is supplied with fluid by way of tubing or line 26. FIG. 1 illustrates two such nozzles on each side of saw blade 10, ensuring uniform coverage with fluid.

Figure 2:
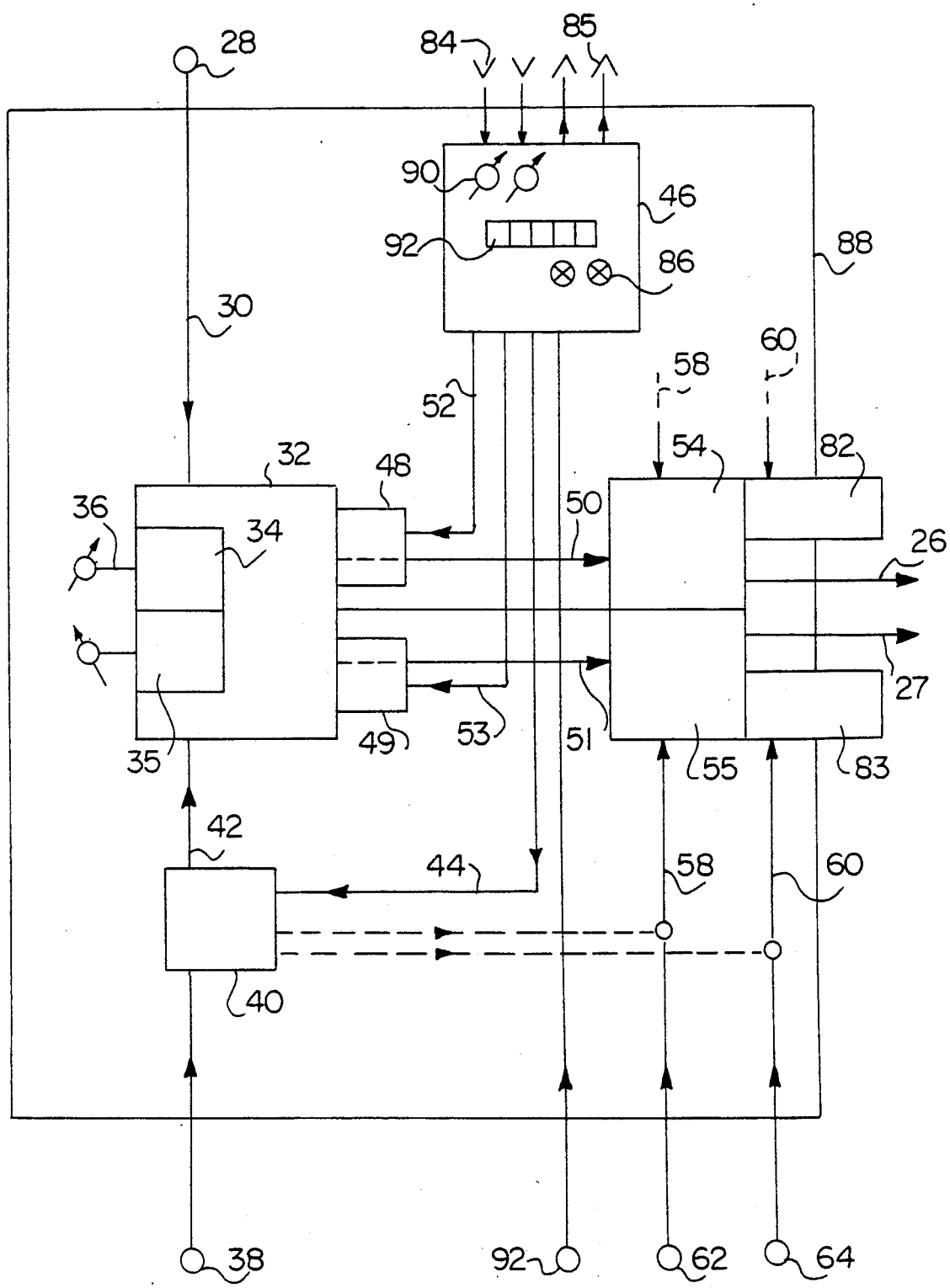
FIG. 2 is a graph illustrating the apparatus in accordance with the invention.

FIG. 2 is a schematic illustration of a device for carrying out the method in accordance with the invention. The device comprises a reserve 28 of liquid, in the form for example of a reservoir or supply line, a closed-circulation pipeline for example that supplies a liquid, especially a lubricant or adhesive. The reservoir on top of the housing has a connection base comprising a valve seat that closes when the connection is released. Reserve 28 communicates by way of a supply line 30 with a series 32 of pumps consisting in the illustrated embodiment of piston-operated flow-control pumps 34 and 35, which can be of conventional design and have for example a mechanical device (a setscrew or similar mechanism) for establishing the volume of liquid to be advanced per stroke. Most flow-control pumps of this type are pneumatic, and the requisite compressed air is supplied in the present embodiment from a source 38 of compressed air by way of a control component or turn-off valve 40 and an air-supply line 42. Component 40 can be activated, turned on and off for instance, by a control unit 46 by way of a control line 44 to supply and discontinue power for the pumps as needed. An appropriate sensor (not illustrated) accommodated in component 40 can simultaneously determine whether there is any power at all available and accordingly being supplied from source 38. This state, the presence or absence of power for the flow-control pumps, can be communicated over a line that parallels control line 44 to control unit 46, where it is appropriately processed. The pumps forward liquid obtained from reserve 28 through supply line 30 to a control component 48 or 49, whence it enters lines 50 and 51. This component is also a valve, an electrically activated magnetic valve for example, which is activated by control unit 46 by way of control lines 52 and 53. The pumps are designed to execute idle strokes, to supply no liquid, that is, when valve 48 is closed by an appropriate control signal from line 52.

Figure 3:
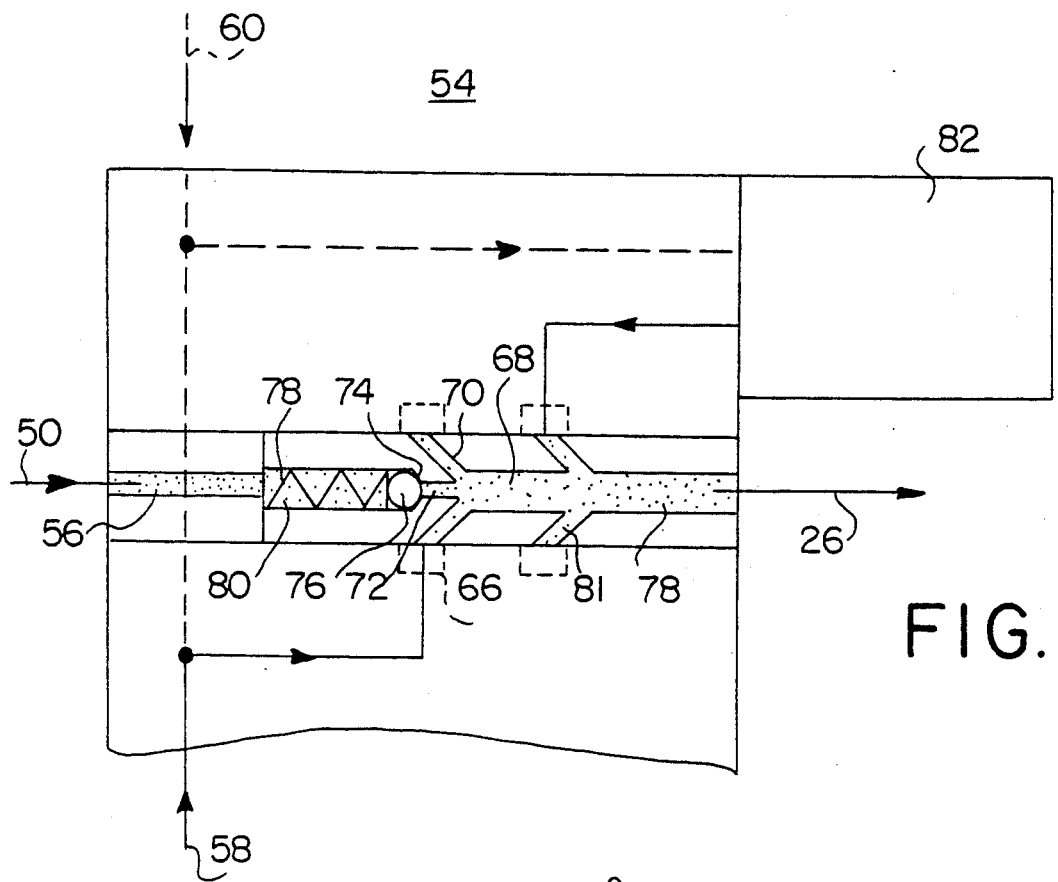
FIG. 3 is a detail illustration of the gyration chamber employed in FIG. 2.

The liquid arriving from the pump arrives by way of line 50 or 51 in the fluidizing section 54 or 55 represented in detail in FIG. 3. This section is supplied with liquid, a lubricant 56 for example, over line 50 and with a compressed gas, air for instance, over a line 58 and optionally a line 60. The gas can be obtained from source 38 by way of component 40. Special sources 62 and 64 of compressed gas can, however, also be provided when the compression medium (the compressed air) that drives the pumps cannot be used for some reason. The compressed gas supplied over line 58 arrives by way of appropriate channels in a closed-circulation system 66, whence it enters a gyration chamber 68 through channels 70 that slope down to the right. Several, preferably three or even more, channels 70 are distributed axially symmetrical around a nozzle-outlet opening 72 for liquid 56. The end of nozzle opening 72 that is remote from the outlet opening has a seat 74 for a valve cone 76 that is forced by a compression spring 78 against the seat, protecting nozzle opening 72 against suctional forces deriving from flow of the gases entering through channels 70 (Venturi effect, surge). When on the other hand water is forced into space 80 by the flow-control pumps, the pressure of the liquid will lift cone 76 off of the seat against the force of spring 78 and allow liquid to flow into nozzle opening 72. This lifting action occurs when the liquid flows around and against the back of the cone, where it can exert pressure.

As may be seen in FIG. 3, the gyration chamber is formed of a divided block with depressions in its dividing surfaces that accommodate block-like subassemblies constituting supply lines, a check nozzle, the gyration chamber itself, and a blending chamber.

The liquid entering gyration chamber 68 through channel 72 is entrained by the gyrating gas entering through channels 70, and there can also be provided additional per se known mechanical gyrating mechanisms of the type employed in oil-burner nozzle systems. The mixture of fine droplets of liquid 56 and gas created in gyration chamber 68 is supplied either directly to the tubing or line 26 that leads to the aforesaid nozzle 24 on the tool or to a blending chamber 78, wherein the fluid created in gyration chamber 68 is injected with additional gas that is introduced through channels 81 similar to the channels 70 that open into blending chamber 78. The gas that is supplied at this point can also derive from line 58, in which case a constriction valve 82 is provided that can control the volume of gas and that is itself controlled by control unit 46 by way of an unillustrated supply line. As an alternative there can be a special line 60 to supply the blending gas.

As will be evident from FIG. 2, the system illustrated in FIG. 3 is double, with each half separately supplied with liquid and gas through its own pumps. Two independent lines 26 and 27 are supplied with fluid and moisten the tool or workpiece either uniformly or if desired at a certain ratio with fluid 22. This is more effective than just positioning a T-connector downstream of line 26 to distribute the fluid, which would not distribute it absolutely uniformly, resulting in ancillary flows in lines 26 and 27 that would differ in impedance.

Control unit 46 can be connected with many different sensors (not illustrated) to determine various operating states that are of interest. It is for example important to determine the readiness to operate of the tool, the circular saw with blade 10 for example, with a special sensor that detects the presence of voltage for operating the motor that drives the tool. Another sensor can determine whether the tool is turned on, whether, that is, the motor that drives blade 10 is on. Another sensor has already been mentioned. It is the sensor that monitors the presence of the energy that drives pumps 34, the compressed air for example (or the electricity if the forwarding pumps are electrically operated). The presence of enough liquid in reserve 28 can also be monitored with an appropriate sensor, optionally along with whether the level of liquid in a reservoir is below a certain level, in which case an alarm will be triggered to inform the operator to fill the reservoir.

Displays 86 of this type are also activated by control unit 46 and can be mounted on the surface of a box-shaped housing 88 that accommodates the whole system illustrated in FIG. 2 in the form of a block and protects it from outside interference. Adjustment buttons 90 can also be connected to control unit 46 to make it possible for example to switch from automatic to externally controlled, manual for instance, operation. The state of such a switch can also be detected and displayed by a sensor. When there is a common housing 88 for all the systems—control unit 46, displays 86, pump 32, and gyrator 54, the housing will be provided with appropriate connections for compressed air (38), electricity (connection 92, unless an internal battery is employed), additional gas connections 62 and 64 in the event that compressed air obtained from connection 38 is not employed, and a connection 28 for liquid unless the housing accommodates or has mounted on it an appropriate liquid reservoir, which would be made of such a transparent material as glass to allow the level of liquid to be determined visually as well. A reservoir of this type could be replaceable or refillable.

Also evident are connections 84 for obtaining signals from sensors outside the housing. These sensors might for example determine the temperature of tool 10 and workpiece 14 and hence the need to supply additional fluid 22. This approach makes it possible to construct a control loop that constantly ensures that just enough fluid 22 arrives at the field of operation to cool and lubricate it, no more (which would lead to environmental pollution) and no less (which would lead to inadequate cooling and premature wear on the tool). It is also possible as an alternative to monitor the moisture and temperature of the waste material with appropriate sensors.

Additional connections 85 release operating data to a central monitoring system and/or to alarm systems. Control unit 46 could also have another display, digital display 92 for example, to display processing times, announce malfunctions, etc. for example. It is practical to actualize the established function of control unit 46 with a microprocessor, which can also be programmable if desired. A microprocessor of this type can scan the various operating states that must be monitored, especially serially, in a chronological sequence, that is, and generate control outputs at prescribed intervals to adjust control components 48, 49, 40, 82 and 83 and the other controllable components and displays described herein.

How the system operates will now be described. Liquid in the form of a lubricant and coolant that is to be blended with gas into a fluid 22 and supplied to the operating field is obtained from reserve 28 in consequence of the pressure inside the oil-supply system or from a reservoir subject to gravity. Pulses of compressed air (or alternatively electric pulses) generated for example by control component 40 subject to central control unit 46 activate flow-control pump 34 or 35, each pulse forwarding a volume of liquid prescribed by control component 36 toward line 50 or 51. When control components 48 are open, the liquid arrives at fluidization block 54 or 55 over lines 50 and 51. If, on the other hand, control components 48 and 49 are closed by a signal from control unit 46, no liquid will be forwarded because the pump's piston is secured by the non-flowing liquid. Control unit 46 interrupts the forwarding process when sensor lines signal that the machine is out of operation or that fluid 22 contains too much liquid. The two lines 50 and 51 can be controlled separately. Similar additional parallel branches can of course also be present, although only two are illustrated herein for purposes of explanation.

A knob can be employed to set the piston stroke and hence the volume of liquid forwarded with each stroke. Control can also depend on the number of strokes per unit of time as also established by control unit 46. The system can accordingly be adapted in various ways to various tools, operating speeds, and lubricants. This adjustment parameter can be called up and displayed on display 92 for example. Colored light-emitting diodes can be employed to indicate that 1. the tool is ready to operate,
2. processing has started,
3. compressed air is available,
4. the pulses are to be established externally,
5. lubricant is available, and
6. the lubricant minimum has been exceeded (green) or is not being complied with (red).

Green light-emitting diodes can also be employed to inform the operator that 1. the compressed-air magnetic valve 40 is activated,
2. the magnetic valve 48 for the first flow-control pump 34 is activated, and
3. the magnetic valve 49 for the second flow-control pump 35 is activated.

Another green display might signal that the tool has been released, and additional red displays might represent such malfunctions as a lack of air and that the lubricant is below a certain level (alarm) or is completely out.

Box 88 could have a switch or potentiometer on the front to establish the intervals between individual strokes (see reference number 90). Another switch could be employed to switch between internal timing and external pulse dictation. Another switch could be provided to provide preliminary lubrication in the case of sensitive tools before the tool, blade 10 for example, is turned on and not turn the tool on or approach it to the workpiece until a few seconds have elapsed. The time interval could also be adjustable.

The function could in that case appear such that, when the machine is turned on, the control unit is informed that the tool is ready to operate. When preliminary lubrication has been selected, a chronologically limited programmed preliminary-lubrication period will commence, during which the magnetic valves for compressed air and for flow-control pumps 40, 48, and 49 are turned on. Once the preliminary-lubrication time has expired or when preliminary lubrication has not been selected, the output for releasing the tool is turned on. The magnetic valve 40 for compressed air remains excited until the machine is turned off.

At least by the time processing commences (with a START PROCESSING input signal supplied to central unit 46), the flow-control pumps will begin forwarding lubricant into the flow of air, which is for example constantly generated in gyration chamber 68. The volume per stroke is mechanically established at the flow-control pumps, and the intensity of lubrication is also controlled by the sequence in which the pumps are activated. Depending on the particular function selected, the pumps are activated by an internal timing program (1–20 seconds) or by way of a "pulse dictated externally" input. Lubrication during such continuous operations as sawing or turning is determined by the internal timing program. In discontinuous operations on the other hand, thread cutting for example, the cutter must be lubricated in accordance with an external command prior to each stage of the operation. The "pulse dictated externally" input is also exploited by accessory subassemblies that convert such analog parameters as motor current consumption and tool temperature into pulse sequences.

As previously mentioned herein, the level of lubricant is monitored in two ways. If the "lubricant present" level is not attained, the "preliminary warning" output will close. If the level drops below "minimum not attained," the "lubricant out" output will be closed and the "release tool" output opened to prevent further machining without lubricant. The same is true of the "compressed air present" input and of the "no air" malfunction.

The equipment, which has been conceived as a compact housing, can be mounted on a standardized securing rail and supplied with a voltage of 220 V for example. Thyristors are preferred appropriate outputs for controlling the valves for lines 52, 53, and 54 because they can deliver the voltage and power conventionally needed for such magnetic valves.

A liquid based on fatty alcohol has been proven as a lubricant for moistening tools that machine metals, especially high-quality steel alloys, which are usually especially difficult to process. Although such fatty alcohols are commercially available, a composition that is particularly appropriate for the present context consists of a preparation of 2-octyl dodecanol-1, to which has been added oxidation and corrosion inhibitors (e.g. 1%-2% by vol.) based on zinc dialkyl dithiophosphate. The liquid can be colored to make it easier to observe in the transparent reservoir or in lines 26 and 27 if they are made of such a transparent material as plastic. The liquid has a density of 0.83 to 0.85 $g/cm^3$ at 20° C. and a viscosity of approximately 60 mPa/sec at 20° C. (determined in accordance with DIN 53 015). Its flash point (determined in accordance with DIN-ISO 2592) is 180° to 200° C. The advantage of this liquid is that only carbon dioxide and steam are produced when it is burned normally, possibly accompanied by low levels of sulfuric and phosphoric oxides. Such a liquid is accordingly not dangerous and pollutes the environment only slightly even though its presence is not desirable. The liquid is also biodegradable.

What is claimed is:

1. In apparatus for moistening articles while they are being used as tools, or as workpieces worked on by such tools, said apparatus comprising:
   (a) a source for a liquid intended as the moistening agent, the source being in the form of a reservoir containing the liquid;
   (b) at least one nozzle means adapted to be mounted in the vicinity of the article to be moistened; and
   (c) a pump, communicating via tubing with said source and with said at least one nozzle means, for forwarding the liquid from said source to said at least one nozzle means;
   the improvement wherein said apparatus further comprises:
   (1) a gyration chamber connected between said pump and said at least one nozzle means, said gyration chamber communicating also with a source of pressurized gas and having means for gyrating the incoming gas together with a prescribed volume of liquid;
   (2) means for generating electrical pulses in response to an input signal;
   (3) control means, responsive to said electrical pulses, for selectively activating the pump in such a way that a prescribed number of volume units of liquid per unit of time is supplied as the prescribed volume of liquid;
   (4) means for monitoring the control means and the pressurized gas; and
   (5) a housing for enclosing the pump, the control means for activating the pump, the monitoring means, the gyration chamber and the tubing for passing the liquid to and from the pump.

2. The apparatus according to claim 1, wherein the article is metallic, and the liquid is a fatty-alcohol mixture with a flash point of about 180° to 200° C., a density of about 0.8 to 0.9 g/cm at 20° C., and a viscosity of about 50 to 200 mPa/sec at 20° C.

3. The apparatus according to claim 2, wherein the liquid is a composition comprising 2-ocytyl dodecanol-1, an oxidation and corrosion inhibitor based on zinc dialkyl dithipophosphate and has a density of about 0.83 to 0.85 $g/cm^3$ at 20° C. and a viscosity of about 60 mPa/sec at 20° C.

4. The apparatus according to claim 1, wherein the liquid is supplied to the gyration chamber and hence to the operating field in pulses, with each pulse supplying a variable but in each case predetermined volume, whereby the apparatus can be set to dictate a desired number of pulses per unit of time depending on the cutting rate and/or the structure of the tool or workplace.

5. The apparatus according to claim 4, wherein the liquid is supplied at such rate that most of the liquid evaporates due to the heat generated by a machining process, with most of the remaining liquid continuing to adhere to and being removed along with waste removed from the workpiece, with little liquid remaining on the tool or workpiece itself.

6. The apparatus according to claim 5, wherein the setting of the number of pulses per unit time is controlled by a loop that depends on the temperatures of the tool, the workpiece, and the waste or on the moisture of the waste.

7. The apparatus according to claim 1, including a blender arranged between the gyration chamber and the tubing leading to the at least one nozzle means, said blender communicating with the source of pressurized gas, and blending a prescribable volume of forwarding gas into the liquid.

8. The apparatus according to claim 1, including at least one additional independently controlled pump with a downstream gyration chamber and optionally a blender, and tubing that supplies separate nozzle means.

9. The apparatus according to claim 1, wherein the pump is a pneumatic piston-driven pump with a mechanically adjustable throughput per stroke.

10. The apparatus according to claim 9, including a valve downstream of the pump and a control unit for activating the valve.

11. The apparatus according to claim 10, including a control component activatable by the control unit, said component controlling the energy supplied to said pump.

12. The apparatus according to claim 11, wherein the pump is pneumatically driven by pressurized gas and wherein the gas for the gyration chamber and the pneumatically driven pump are derived from the same source of pressurized gas, which source can optionally be controlled by the control component.

13. The apparatus according to claim 10, wherein the apparatus is used in connection with a machine tool adapted to machine a workpiece with a cutting tool, and wherein the control means are connected to sensors for determining at least one of the following operating states:
    (a) readiness of the machine tool to operate,
    (b) commencement of machining,
    (c) presence of energy for operating the pump,
    (d) presence of liquid in the reservoir for supply line,
    (e) state of a switch that switches between automatic control and manual control by said control means,
    (f) liquid in the reservoir below a prescribed level, (g) temperature of the tool and/or workpiece above a specific level, (h) residual moisture content of machine waste products below an initial lower level or above another and higher level.

14. The apparatus according to claim 13, wherein the control means have control-voltage output terminals, and said apparatus further comprises at least one electrically activated valve for performing one or more of the following functions:

a) controlling the line that supplies the energy that drives the pump, b) controlling the line that supplies the pressurized gas, c) controlling the line leading out of the pump, d) controlling a component that releases the tool, e) controlling a component that activates an alarm, f) controlling a component that activates an optical display, and g) controlling a component for activating external monitoring equipment.

15. The apparatus according to claim 13, wherein the control means comprise a microprocessor that serially senses operating states of the apparatus and generates control outputs in accordance with these operating states and a prescribed program.

16. The apparatus according to claim 1, wherein on top of the housing there is provided a transparent reservoir for the liquid so that the level of its contents can be observed.

17. The apparatus according to claim 16, wherein the reservoir on top of the housing has a connection base comprising a valve that closes when the connection is released.

18. The apparatus according to claim 1, wherein the gyration chamber has a central axis, a liquid-supply nozzles with a check valve at one end and axially symmetrical channels that slope down to the gyration chamber axis and transport gas.

19. The apparatus according to claim 18, wherein the gyration chamber merges into a blending chamber having a central axis and several axially symmetrical channels that slope down to the blending chamber axis and transport blending gas.

20. The apparatus according to claim 18, wherein the gyration chamber is formed of a divided block with depressions in its dividing surfaces that accommodate block-like assemblies constituting supply lines, a check nozzle, the gyration chamber itself, and the blending chamber.

* * * * *

UNITED STATES PATENT AND TRADEMARK OFFICE
CERTIFICATE OF CORRECTION

PATENT NO. : 5,050,532
DATED : September 24, 1991
INVENTOR(S) : Klaus Ruppert

It is certified that error appears in the above-identified patent and that said Letters Patent is hereby corrected as shown below:

Col. 10, lines 15-16   Delete " workplace " and substitute -- workpiece --

Col. 10, line 65   Delete " for supply line "

Col. 12, line 24   Delete " assemblies " and substitute --subassemblies--.

Signed and Sealed this

Twentieth Day of July, 1993

Attest:

MICHAEL K. KIRK

Attesting Officer    Acting Commissioner of Patents and Trademarks